United States Patent [19]

Fannin

[11] Patent Number: 4,657,311
[45] Date of Patent: Apr. 14, 1987

[54] POWER TAKE-OFF CONTROL WITH PARKING BRAKE INTERLOCK

[75] Inventor: Richard C. Fannin, Grafton, Ohio
[73] Assignee: Allied Corporation, Morristown, N.J.
[21] Appl. No.: 773,170
[22] Filed: Sep. 6, 1985
[51] Int. Cl.[4] .............................................. B60T 13/00
[52] U.S. Cl. ....................................... 303/71; 303/6 M
[58] Field of Search ...................... 303/71, 70, 80, 81, 303/9, 29, 6 M

[56] References Cited

U.S. PATENT DOCUMENTS 4,058,345 11/1977 Klimek .................................. 303/71
4,163,584 8/1979 Koenig .................................. 303/71

Primary Examiner—Duane A. Reger
Assistant Examiner—M. C. Graham
Attorney, Agent, or Firm—Ken C. Decker; William N. Antonis

[57] ABSTRACT

A fluid pressure control system engages the power take-off of a tractor-trailer combination vehicle equipped with air brakes while simultaneously applying the parking brakes of both the tractor and the trailer. However, when the vehicle is to be moved and the power take-off disengaged, the vehicle operator must, in addition to moving the power take-off control to the position disengaging the power take-off, must also operate the parking control valves which release the parking brakes on both the tractor and the trailer. Accordingly, the parking brakes cannot be inadvertently released by merely disengaging the power take-off control, although engagement of the power take-off control automatically sets or applies the parking brakes on both the tractor and the trailer.

6 Claims, 1 Drawing Figure

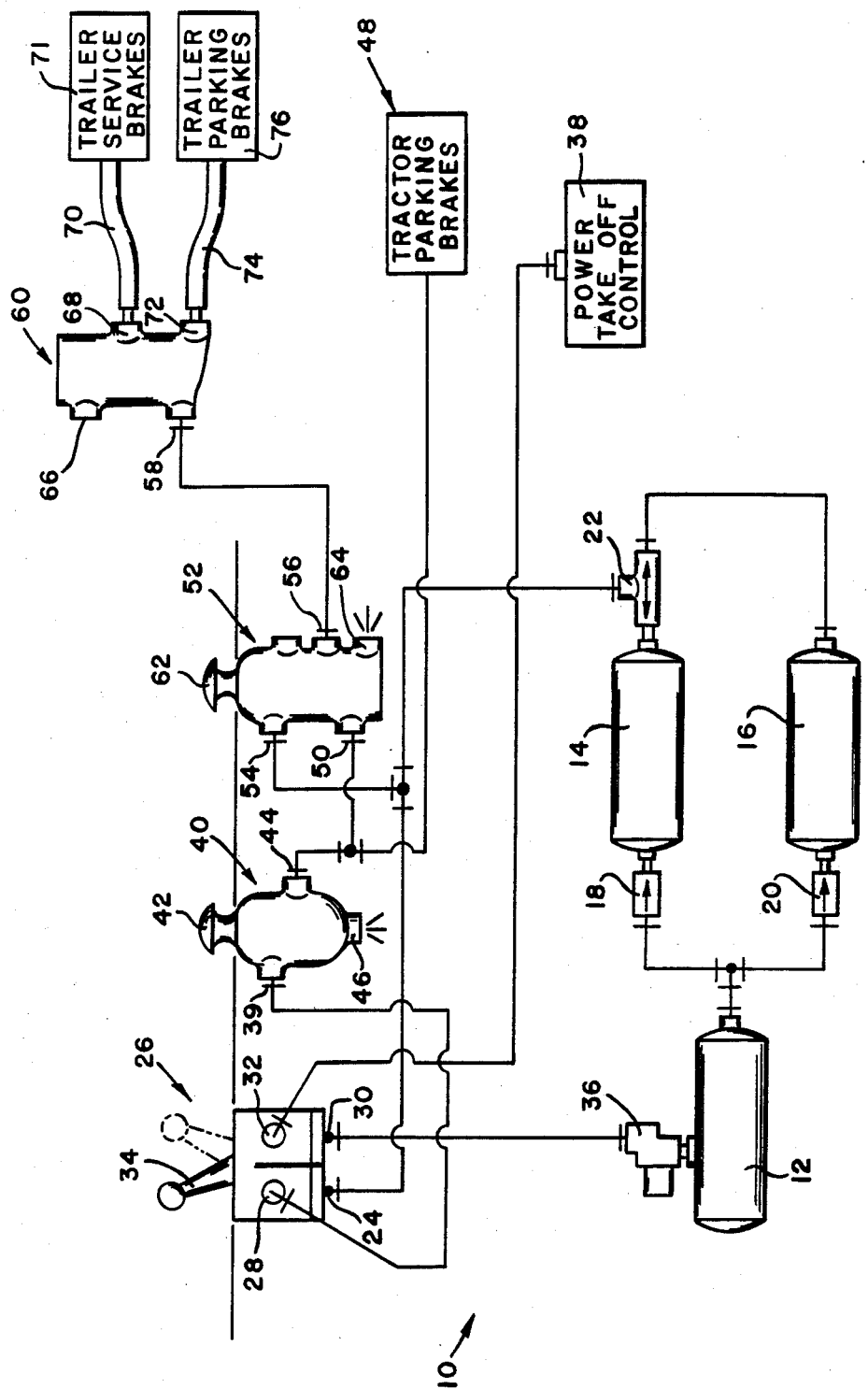

POWER TAKE-OFF CONTROL WITH PARKING BRAKE INTERLOCK

This invention relates to a control for the power take-off of a vehicle equipped with fluid pressure actuated brakes in which the parking brakes of the vehicle are set automatically when the power take-off control is engaged.

Many heavy duty vehicles of the type equipped with air brakes carry accessory devices that are powered by the power take-off from the vehicle engine. These devices are operated only when the vehicle is stationary, as it is often dangerous to operate these devices when the vehicle is moving. The present invention provides a control system for controlling the parking brakes and the power take-off of the vehicle. The invention has the advantage of automatically setting the parking brakes whenever the power take-off control is engaged, and maintains the parking brakes applied even after the power take-off is disengaged. Accordingly, the parking brakes cannot be inadvertently released by disengaging the power take-off control. The parking brakes must be released by another control after the power take-off control is disengaged. Furthermore, the present invention provides a system in which the air supplied to the power take-off control can never intercommunicate with the parking brake air supply.

These and other advantages of the present invention will become apparent from the following description, with reference to the accompanying drawing, the sole Figure of which is a schematic diagram of a control system made pursuant to the teachings of the present invention.

Referring now to the drawing, the control system generally indicated by the numeral 10 includes a conventional supply reservoir 12 which is charged by the automotive air compressor (not shown) which is operated by the engine of the vehicle. Supply reservoir 12 is communicated to dual service reservoirs 14, 16 through corresponding one-way check valves 18, 20. The service reservoirs 14, 16 are communicated through a conventional dual brake valve (not shown) to actuate the front and rear service brakes of the vehicle. A double check valve 22 selects the higher of the pressure levels in the reservoir 14 or 16 and communicates this pressure level to a supply port 24 on one side of a toggle-actuated power take-off control valve generally indicated by the numeral 26.

The power take-off control valve 26 is conventional, and includes a first set of supply and delivery ports 24, 28 and a second set of supply and delivery ports 30, 32. The valve 26 is conventionally mounted behind the vehicle dashboard, and includes an operating toggle lever 34 which may be operated by the vehicle operator between the positions illustrated in the solid lines in the Figure to the position illustrated in the dashed lines in the Figure. When the toggle lever 34 is disposed in the position illustrated in the solid lines, communcation between the supply port 24 and delivery port 28 is cut off, while the delivery port 28 is vented to atmosphere, and communication is initiated between the supply port 30 and the delivery port 32. When the toggle lever 34 is disposed in the position illustrated in the dashed lines, communication between the supply port 24 and the delivery port 28 is initiated, and communication between the supply port 30 and the delivery port 32 is cut off, and the delivery port 32 is vented to atmosphere.

The supply port 30 is connected to the reservoir 12 through a conventional pressure protection valve 36, which closes to maintain air pressure in the supply reservoir 12 when the pressure therein reaches a predetermined low level. The delivery port 32 is communicated to the power take-off control device 38. Power take-off control device 38 may be any conventional device used to actuate the aforementioned power take-off operated accessory. For example, the power take-off control device 38 may be an air-actuated cylinder, or it may be an air pressure actuated electrical switch. Accordingly, the air supplied to the supply port 30 from the supply reservoir 12 through the pressure protection valve 36 is the accessory air supply used to actuate the power take-off control device 38 when the toggle 34 is moved to the appropriate position.

The delivery port 28 is communicated to a supply port 39 of a conventional push-pull parking brake control valve generally indicated by the numeral 40. Like the control valve 26, the valve 40 is conventionally mounted on the vehicle dashboard and includes an operator actuated plunger 42 which is accessible to the vehicle operator. The control valve 40 is used on most air brake equipped vehicles in use today, and is designed such that when the plunger 42 is pushed in, communication is initiated between the supply port 39 and a delivery port 44. However, when the plunger 42 is pulled out, communication between the ports 39 and 44 is terminated, and the delivery port 44 is exhausted to atmosphere through an exhaust port 46. Valve 40 is also designed such that, when the pressure at the supply port 39 drops below a predetermined pressure level, the control plunger 42 automatically pops out, thereby automatically terminating communication between the ports 39 and 44 and automatically venting the port 44 to the port 46. The delivery port 44 is communicated to conventional tractor parking brakes generally indicated by the numeral 48. Tractor parking brakes 48 are conventionally the spring-applied, fluid pressure released type in which a spring automatically applies the parking brakes when the air pressure communicated thereto is vented, and the parking brakes are released by communicating air pressure to the parking brakes.

The delivery port 44 is also communicated to a control port 50 of a conventional trailer supply valve 52. The supply port 54 of the valve 52 is communicated to the double check valve 22, and the delivery port 56 of the valve 52 is communicated to the supply port 58 of a conventional tractor protection valve 60. The valve 52 operates in a similar manner as the valve 40, and similarly includes an operator operated plunger 62 which controls communication between the ports 54, 56 and an exhaust port 64. However, the valve 52 is also responsive to the pressure at the control port 50 thereof to automatically "pop out" and therefore communicate the delivery port 56 to the exhaust port 64 whenever the pressure at the control port 50 drops below a predetermined level. Accordingly, plunger 62 may be pushed in to communicate supply port 54 with delivery port 56, or pulled out to terminate communication between the supply port 54 and delivery port 56 and to communicate delivery port 56 to the exhaust port 64. The plunger 62 automatically pops out whenever the pressure level at supply port 54 drops below a predetermined level, or when the pressure at the control port 50 drops below a predetermined level.

Tractor protection valve 60 further includes a supply port 66 which is connected to the aforementioned dual brake valve (not shown) and permits communication between the supply port 66 and a delivery port 68 to supply control air through the line 70 to the trailer service brake system indicated schematically at 71 whenever a trailer is connected to the tractor upon which the tractor protection valve 60 is mounted. Similarly, the tractor protection valve 60 includes a delivery port 72 which is communicated with the supply port 58 whenever the tractor and trailer are connected together. The delivery port 72 supplies supply air through line 74 to the trailer, thus providing hold-off air to the trailer parking brakes indicated schematically as at 76. The trailer parking brakes 76 are similar to the parking brakes 48 on the tractor.

In operation, the power take-off control device 38 is engaged by moving the toggle lever 34 to the position illustrated in the solid lines in the drawing. This effects communication of accessory supply air from the supply reservoir 12 through the supply port 30 of the valve 26 to the delivery port 32 thereof and from there to the power take-off control device 38. At the same time, communication between the supply port 24 and the delivery port 28 of the control valve 26 is shut off, and the delivery port 28 is vented to atmosphere. Accordingly, the supply port 39 of the valve 40 is also vented to atmosphere, thereby causing the plunger 42 to automatically pop out, to thereby terminate communication between the supply port 39 and the delivery port 44 of the valve 40 and to initiate communication between the delivery port 44 and the exhaust port 46. The hold-off pressure communicated to the tractor parking brakes 48 is automatically vented through the exhaust port 46, thereby causing the tractor parking brakes 48 to apply. Furthermore, since control port 50 is also connected to delivery port 44, the pressure level at control port 50 will also be vented, thereby causing the plunger 62 of valve 52 to pop out. Communication between supply port 54 and delivery port 56 of valve 52 is terminated, and the delivery port 56 is communicated to exhaust port 64, thereby exhausting fluid pressure communicated to the trailer supply line 74. Accordingly, the trailer parking brakes 76 will then be applied. Therefore, movement of the toggle lever 34 to the position illustrated in solid lines of the drawing not only communicates supply air to the power take-off control device 38, but it also applies both the tractor parking brakes 48 and the trailer parking brakes 76. Even if the vehicle operator attempted to push in the plungers 42 and 62 in an attempt to release the parking brakes, the parking brakes cannot be released, since the pressure level at supply port 39 has been vented. Even though pressure is communicated to the supply port 54 at all times, the venting of the pressure level at supply port 50 prevents the valve 52 from being actuated to release the parking brakes. Accordingly, the parking brakes on both the tractor and trailer remain set as long as the toggle lever 34 remains in the position illustrated in solid lines in the Figure.

When it is desired to disengage the power take-off control and move the vehicle, the toggle lever 34 is moved to the position illustrated in the dashed lines in the Figure, thereby terminating communication between the supply port 30 and the delivery port 32 and exhausting the delivery port 32 to atmosphere. The pressure level communicated to the power take-off control device 38 is thereby vented, thereby disengaging the power take-off. At the same time, communication is initiated between the supply port 24 and delivery port 28 of valve 26, thereby communicating fluid pressure to the supply port 39 of valve 40. However, the vehicle still cannot be moved and the parking brakes 48 and 76 remain set, even though the power take-off control has been disengaged, since the valves 40 and 52 remain in the condition venting their corresponding delivery ports 44, 56 to their corresponding exhaust ports 46, 64. The operator must then push in plungers 42 and 62, thereby communicating supply port 39 to delivery port 44 to release the tractor parking brakes 48, and to communicate fluid pressure to control port 50 of the valve 52. The operator may now push in the plunger 62 to communicate fluid pressure to the trailer supply line 74, thereby releasing the trailer parking brakes, thereby permitting the vehicle to be moved.

Accordingly, it will be seen that the single act of moving the toggle lever 34 to the position illustrated in the solid lines in the Figure not only engages the power take-off control 38, but automatically applies the parking brakes on both the tractor and the trailer of the vehicle. Although moving the toggle lever 34 to the position illustrated by the dashed lines of the Figure disengages the power take-off control device 38, the vehicle still may not be moved until the tractor and trailer parking brakes 48, 76 are released by operating the plungers 42 and 62. Accordingly, the parking brakes cannot be inadvertently released by merely disengaging the power take-off control.

I claim:

1. Fluid pressure control system comprising a fluid pressure source, control valve means having a pair of supply ports communicated to said pressure source and a pair of delivery ports, said control valve means being operable from a first condition communicating one of said supply ports with a corresponding one of said delivery ports of said control valve means and closing communication between the other supply port and the other of said delivery ports of said control valve means while venting said other delivery port, said control valve means being shiftable to a second condition communicating the other supply port with the other delivery port while closing communication between said one supply port and said one delivery port and venting the latter, parking control valve means having a supply port connected to said one delivery port of said control valve means and a delivery port communicated to parking brake control means, said parking control valve means being responsive to the fluid pressure level at the supply port of the latter to vent the delivery port of the parking control valve means when the pressure level at the supply port drops below a predetermined value, and accessory control means for controlling an accessory other than said parking brake means, said accessory control means being communicated with the other delivery port of the control valve means.

2. Fluid pressure control system as claimed in claim 1, wherein said parking brake control means is manually actuated to selectively move from a first condition communicating the supply and delivery ports of the parking brake control valve means to a second condition venting the delivery port of the control brake control valve means.

3. Fluid pressure control system as claimed in claim 1, wherein said parking brake means includes a first portion and a second portion, said parking brake control means including first valve means for operating the first portion of the parking brake means and second valve means for operating the second portion of the parking brake means, each of said valve means having a supply port communicated with said fluid pressure source and a delivery port communicated with their corresponding first or second portion of the parking brake means, each of said first and second valve means being responsive to the pressure level at its supply port to vent its delivery port when the pressure level at its supply port drops below a predetermined value.

4. Fluid pressure control system as claimed in claim 3, wherein said second valve means includes a control port communicated with the delivery port of said first valve means, said second valve means being responsive to the pressure level at the delivery port of said first valve means to vent the delivery port of said second valve means when the pressure level at the delivery port of said first valve means drops below a predetermined level.

5. Fluid pressure control system as claimed in claim 3, wherein said fluid pressure source is divided into first and second isolated sections, one of said sections of said fluid pressure source being communicated to said one supply port of said control valve means, the other section of said fluid pressure source being communicated to the other supply port of said control valve means.

6. Fluid pressure control system as claimed in claim 1, wherein said fluid pressure source is divided into first and second isolated sections, one of said sections of said fluid pressure source being communicated to said one supply port of said control valve means, the other section of said fluid pressure source being communicated to the other supply port of said control valve means.

* * * * *